(12) United States Patent
Badaye et al.

(10) Patent No.: US 9,141,237 B2
(45) Date of Patent: **\*Sep. 22, 2015**

(54) CAPACITIVE SENSING PATTERN

(75) Inventors: Massoud Badaye, Santa Clara, CA (US); David Hoch, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 645 days.

This patent is subject to a terminal disclaimer.

(21) Appl. No.: 13/540,508

(22) Filed: Jul. 2, 2012

(65) Prior Publication Data

US 2012/0268143 A1 Oct. 25, 2012

Related U.S. Application Data

(63) Continuation of application No. 12/509,385, filed on Jul. 24, 2009, now Pat. No. 8,237,453.

(51) Int. Cl.
*G01R 27/26* (2006.01)
*G06F 3/044* (2006.01)

(52) U.S. Cl.
CPC ..................... *G06F 3/044* (2013.01)

(58) Field of Classification Search
CPC  G06F 3/044; G06F 2203/0411; G06F 3/0416
USPC ......................... 324/658, 667, 674
See application file for complete search history.

(56) References Cited

U.S. PATENT DOCUMENTS

| 7,129,935 | B2 | 10/2006 | Mackey |
| 7,202,859 | B1 | 4/2007 | Speck et al. |
| 7,382,139 | B2 | 6/2008 | Mackey |
| 7,777,503 | B2 | 8/2010 | Reynolds |
| 2007/0057167 | A1 | 3/2007 | Mackey et al. |
| 2007/0074914 | A1 | 4/2007 | Geaghan et al. |
| 2008/0024329 | A1 | 1/2008 | Mackey et al. |
| 2008/0079699 | A1 | 4/2008 | Mackey |
| 2009/0021267 | A1 | 1/2009 | Golovchenko et al. |
| 2009/0159344 | A1 | 6/2009 | Staton |
| 2009/0194344 | A1 | 8/2009 | Harley et al. |
| 2012/0249476 | A1* | 10/2012 | Schwartz et al. ............. 345/174 |

FOREIGN PATENT DOCUMENTS

| WO | WO-2005/121940 | 12/2005 |
| WO | WO-2008/042674 | 4/2008 |

\* cited by examiner

*Primary Examiner* — Vincent Q Nguyen

(57) ABSTRACT

A capacitive input device includes a plurality of receiver sensor electrodes oriented substantially parallel to a first axis proximate to a sensing region of the capacitive input device. The capacitive sensing device also includes a plurality of transmitter sensor electrodes oriented substantially parallel to a second axis proximate to the sensing region and configured to be capacitively coupled with the plurality of receiver sensor electrodes. The at least one receiver sensor electrode of the plurality of receiver sensor electrodes is disposed in a configuration forming multiple crossings with a line that is parallel to the second axis, the multiple crossings occurring proximate to the sensing region.

18 Claims, 14 Drawing Sheets

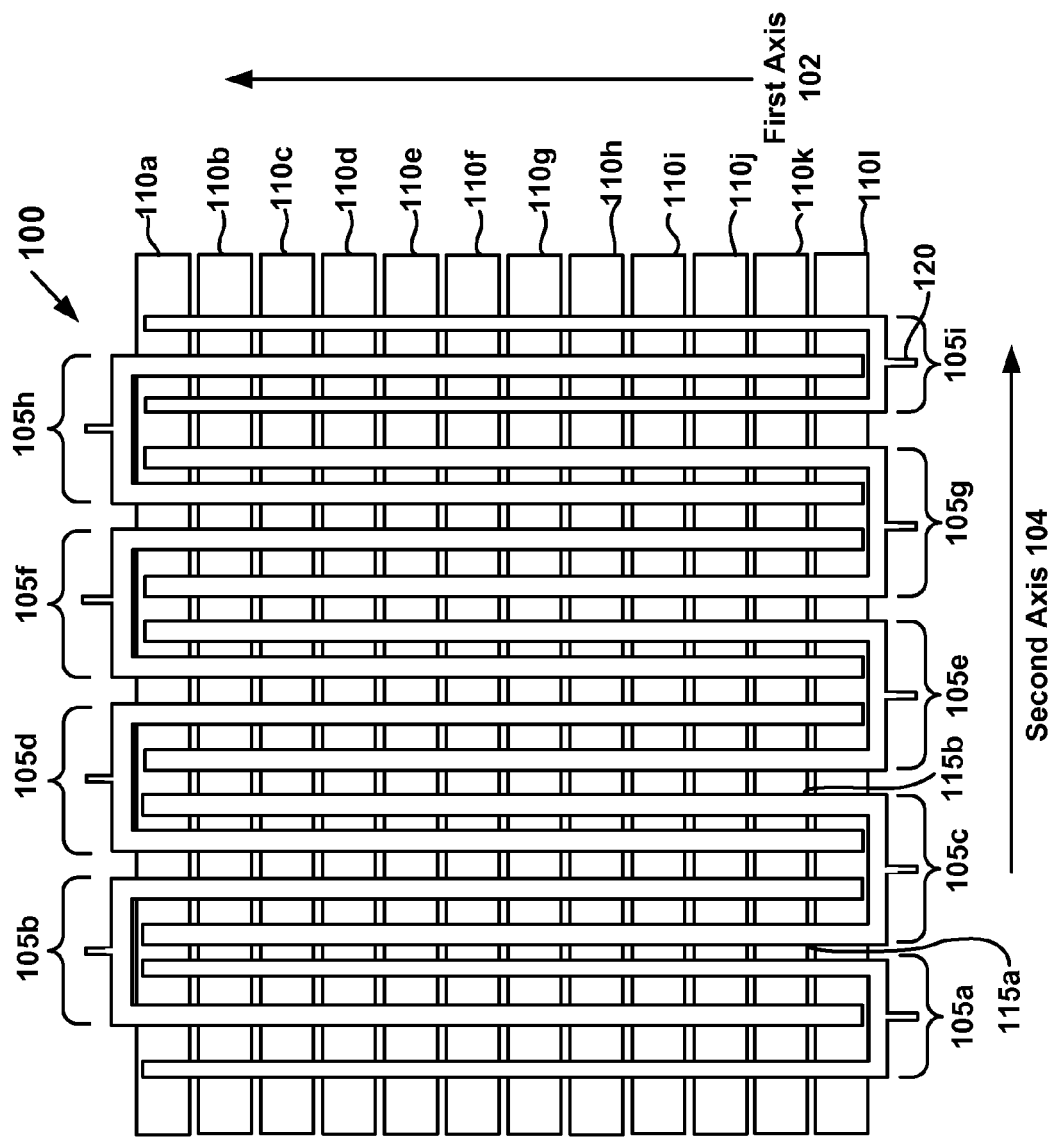

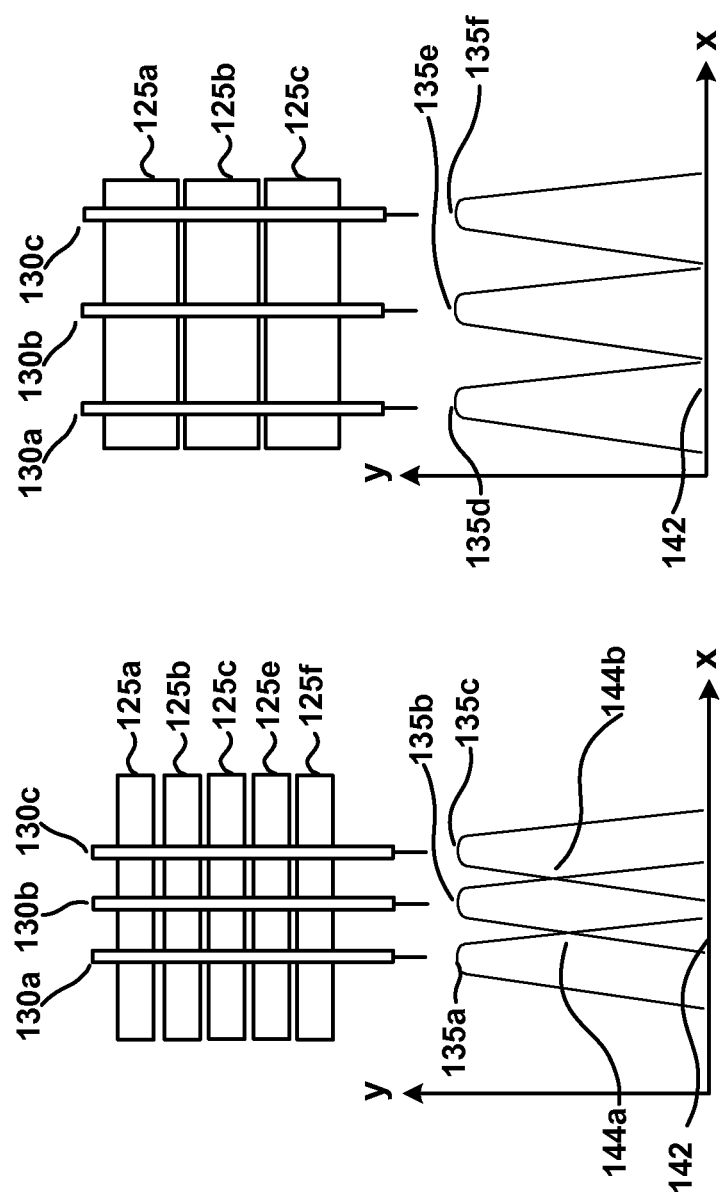

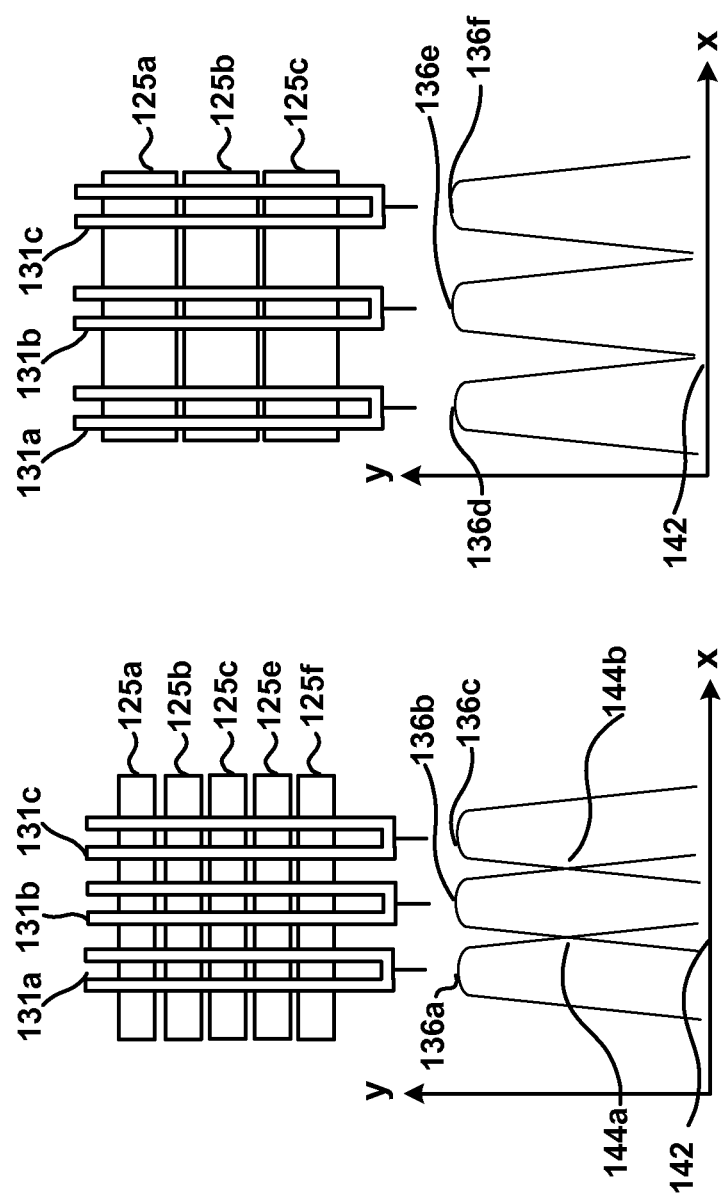

CAPACITIVE SENSING PATTERN

CROSS-REFERENCE TO RELATED APPLICATIONS (CONTINUATION)

This application is a continuation and claims priority to and benefit of the patent application Ser. No. 12/509,385, entitled "Capacitive Sensing Pattern," with filing date Jul. 24, 2009, now U.S. Pat. No. 8,237,453 and assigned to the assignee of the present application, the disclosure of which is hereby incorporated herein by reference.

BACKGROUND

Capacitive sensing devices are widely used in modern electronic devices. For example, capacitive sensing devices have been employed in music and other media players, cell phones and other communications devices, remote controls, personal digital assistants (PDAs), and the like. These capacitive sensing devices are often used for touch based navigation, selection, or other functions. These functions can be in response to one or more fingers, styli, other objects, or combination thereof providing input in the sensing regions of respective capacitive sensing devices. However, there exist many limitations to the current state of technology with respect to capacitive sensing devices.

BRIEF DESCRIPTION OF THE DRAWINGS

The accompanying drawings, which are incorporated in and form a part of this specification, illustrate embodiments of the technology for a trans-capacitive sensor pattern and, together with the description, serve to explain principles discussed below:

FIG. 1A is a block diagram of an example sensor electrode pattern in accordance with embodiments of the present technology.

FIG. 1B is a block diagram of a conventional fine pitch sensor along with a sensor response to a finger moving along an X-direction.

FIG. 1C is a block diagram of a conventional large pitch sensor along with a sensor response to a finger moving along an X-direction.

FIG. 1D is a block diagram of an example sensor electrode pattern along with a sensor response to a finger moving along an X-direction in accordance with embodiments of the present technology.

FIG. 1E is a block diagram of an example sensor electrode pattern along with a sensor response to a finger moving along an X-direction in accordance with embodiments of the present technology.

Figure 1F:
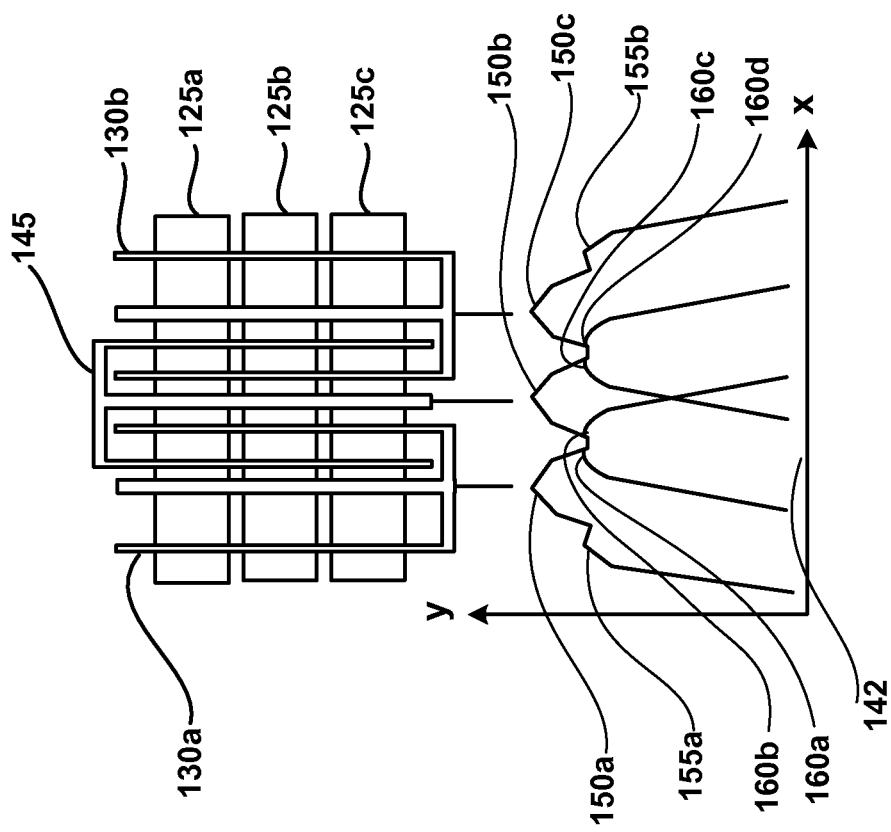
FIG. 1F is a block diagram of an example sensor electrode pattern along with a sensor response to a finger moving along an X-direction in accordance with embodiments of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the present technology will be described in conjunction with embodiments, it will be understood that the descriptions are not intended to limit the present technology to these embodiments. On the contrary, the descriptions are intended to cover alternatives, modifications and equivalents, which may be included within the spirit and scope as defined by the appended claims. Furthermore, in the following detailed description, numerous specific details are set forth in order to provide a thorough understanding of embodiments of the present technology. However, one of ordinary skill in the art will understand that embodiments of the present technology may be practiced without these specific details. In other instances, well known methods, procedures, components, and circuits have not been described in detail as not to unnecessarily obscure aspects of the present technology.

Overview of Discussion

Embodiments in accordance with the present technology pertain to a mutual capacitance sensing apparatus and its usage. In one embodiment in accordance with the present technology, the mutual capacitance sensing apparatus comprising a capacitive sensing pattern enabling the detection of multiple input objects concurrently disposed in a sensing region. For example, the capacitive sensing pattern described herein enables improved capacitive sensing of an input object's positioning within the sensing region.

The mutual capacitance sensing apparatus includes a sensing region. The mutual capacitance sensing apparatus is sensitive to input by one or more input objects (e.g. fingers, styli, etc.), such as the position of an input object within the sensing region. "Sensing region" as used herein is intended to broadly encompass any space above, around, in and/or near the input device in which sensor(s) of the input device is able to detect user input. In a conventional embodiment, the sensing region of an input device extends from a surface of the sensor of the input device in one or more directions into space until signal-to-noise ratios prevent sufficiently accurate object detection. The distance to which this sensing region extends in a particular direction may be on the order of less than a millimeter, millimeters, centimeters, or more, and may vary significantly with the type of sensing technology used and the accuracy desired. Thus, embodiments may require contact with the surface, either with or without applied pressure, while others do not. Accordingly, the sizes, shapes, and locations of particular sensing regions may vary widely from embodiment to embodiment.

Sensing regions with rectangular two-dimensional projected shape are common, and many other shapes are possible. For example, depending on the design of the sensor array and surrounding circuitry, shielding from any input objects, and the like, sensing regions may be made to have two-dimensional projections of other shapes. Similar approaches may be used to define the three-dimensional shape of the sensing region. Input objects in the sensing region may interact with the mutual capacitance sensing apparatus.

For example, sensor electrodes of the input device may use arrays or other patterns of sensor electrodes to support any number of sensing regions. As another example, the sensor electrodes may use capacitive sensing technology in combination with resistive sensing technology to support the same sensing region or different sensing regions. Examples of the types of technologies that may be used to implement the various embodiments of the invention may be found in U.S. Pat. Nos. 5,543,591, 5,648,642, 5,815,091, 5,841,078, and 6,249,234.

As another example, some capacitive implementations utilize transcapacitive sensing methods based on the capacitive coupling between sensor electrodes. Transcapacitive sensing methods are sometimes also referred to as "mutual capacitance sensing methods." In one embodiment, a transcapacitive sensing method operates by detecting the electric field coupling one or more transmitting electrodes with one or more receiving electrodes. Proximate objects may cause changes in the electric field, and produce detectable changes in the transcapacitive coupling. Sensor electrodes may transmit as well as receive, either simultaneously or in a time multiplexed manner. Sensor electrodes that transmit are sometimes referred to as the "transmitting sensor electrodes," "driving sensor electrodes," "transmitters," or "drivers"—at least for the duration when they are transmitting. Other names may also be used, including contractions or combinations of the earlier names (e.g. "driving electrodes" and "driver electrodes." Sensor electrodes that receive are sometimes referred to as "receiving sensor electrodes," "receiver electrodes," or "receivers"—at least for the duration when they are receiving. Similarly, other names may also be used, including contractions or combinations of the earlier names. In one embodiment, a transmitting sensor electrode is modulated relative to a system ground to facilitate transmission. In another embodiment, a receiving sensor electrode is not modulated relative to system ground to facilitate receipt.

In one embodiment in accordance with the present technology, the capacitive sensing pattern includes a plurality of receiver sensor electrodes oriented along an x axis proximate to a sensing region and a plurality of transmitter sensor electrodes oriented along a y axis proximate to the sensing region. At least one of the receiver sensor electrodes forms multiple crossings with a line that is parallel to the y axis. This is in contrast to the common sensor electrode patterns in which a sensor electrode of a matrix of straight sensor electrodes oriented along an x axis forms only a single crossing with a line that is parallel to the y axis.

Furthermore, at least two of the plurality of receiver sensor electrodes or at least two of the plurality of transmitter sensor electrodes are interleaved with each other. The term "interleaved" refers to occupying the boundary space of another. For example, a U-shaped transmitter sensor electrode may be inverted and a portion of the inverted U of the U-shaped transmitter sensor electrode may be positioned between the two open-ended portions of another U-shaped transmitter sensor electrode. In other words, "interleaved" may be referred to in the context of sensor electrodes as a sensor electrode filling a two-dimensional fillable space provided by another sensor electrode.

Each crossing of a sensor electrode oriented along a first axis and a sensor electrode oriented along a second axis constitutes a "pixel". At each pixel, the mutual capacitance between the sensor electrode oriented along a first axis and the sensor electrode oriented along the second axis may be measured, resulting in a "pixel capacitance". The pixel capacitance may be perturbed by the presence of an input object, such as a finger, near the pixel, resulting in a signal referred to as the "pixel capacitance change" or $\Delta C_f$.

Common sensor electrode patterns including transmitter and receiver sensor electrodes have a limited ability to accurately detect the presence of input objects. One example of a common sensor electrode pattern is shown in FIG. 1B. FIG. 1B shows a fine pitch sensor and a sensor response to a finger moving along the X-direction. Receiver sensor electrodes 130a, 130b and 130c are shown. Transmitter sensor electrodes 125a, 125b, 125c, 125d and 125e (hereinafter, "sensor electrodes 125a-125e") are also shown. The pitch of a sensor refers to the distance between the electrodes. As such, the pitch of the receiver and transmitter electrodes determines the arrangement of the pixels, specifically the distance between a pixel and any other neighboring pixel.

The response graph in FIG. 1B shows signal peaks 135a, 135b and 135c directly below the corresponding receiver sensor electrodes 130a, 130b and 130c, respectively. Signal peaks 135a, 135b and 135c represent the peak signal carried by receiver sensor electrodes 130a, 130b and 130c, respectively. As a finger moves from the left to the right along the X-direction, it passes over receiver sensor electrode 130a and receiver sensor electrode's 130a crossings over at least one of sensor electrodes 125a-125e. A peak signal 135a carried by receiver sensor electrode 130a is shown in the graph directly below the middle of receiver electrode 130a. As the finger continues to move further to the right along the X-direction, it passes over the pitch between receiver sensor electrode 130a and receiver sensor electrode 130b.

As the finger continues to move from the left to the right along the X-direction, it passes over receiver sensor electrode 130b and receiver sensor electrode's 130 crossing over at least one of sensor electrodes 125a-125e. A peak signal 135b carried by receiver sensor electrode 130b is shown in the graph directly below the middle of receiver electrode 130b. Of significance, there is shown an overlap 144a between the two graphed lines associated with peak signals 135a and 135b. Overlap 144a of the signals occurs significantly above the noise floor 142.

Continuing on with the description of FIG. 1B, as the finger continues to move further to the right along the X-direction, it passes over the pitch between receiver sensor electrode 130b and receiver sensor electrode 130c. As the finger continues still to move further to the right along the X-direction, it passes over receiver sensor electrode 130c and receiver sensor electrode's 130c crossing over at least one of sensor electrodes 125a-125e. A peak signal 135c carried by receiver sensor electrode 130c is shown in the graph directly below the middle of receiver electrode 130c. Of significance, there is shown an overlap 144b between the two graphed lines associated with peak signals 135b and 135c. Overlap 144b of the signals occurs significantly above the noise floor 142.

In contrast, FIG. 1C shows a large pitch sensor and a sensor response to a finger moving along an X-direction. In FIG. 1C, to create this "large pitch sensor", the distance between receiver sensor electrodes 130a, 130b and 130c is increased as compared to the distance between receiver sensor electrodes 130a, 130b and 130c of FIG. 1B. In FIG. 1C, only transmitter sensor electrodes 125a, 125b and 125c are shown. As a finger moves from the left to the right along the X-direction, it passes over receiver sensor electrode 130a and receiver sensor electrode's 130a crossing over at least one of sensor electrodes 125a, 125b and 125c. A peak signal 135d carried by receiver sensor electrode 130a is shown in the graph directly below the middle of receiver electrode 130a. As the finger continues to move further to the right along the X-direction, it passes over the pitch between receiver sensor electrode 130a and receiver sensor electrode 130b.

As the finger continues to move from the left to the right along the X-direction, it passes over receiver sensor electrode 130b and receiver sensor electrode's 130b crossing over at least one of transmitter sensor electrodes 125a, 125b and 125c. A peak signal 135e carried by receiver sensor electrode 130b is shown in the graph directly below the middle of receiver electrode 130b. Of significance, there is no overlap between the two graphed lines associated with peak signals 135d and 135e. The lack of overlapping indicates that the signals from the neighboring sensors associated with peak signals 135d and 135e in the interpolation area are near noise floor 142.

The interpolation area refers to the location of the finger when it is between signal peaks. In order to determine the precise location of the finger in this area, at least two signals (e.g. 135d and 135e are necessary) although it is common to use more than two signal values to determine finger position. However, unlike in FIG. 1B where overlaps 144a and 144b occur above the noise floor 142, the larger pitch of the sensor in FIG. 1C result in that any overlaps occur below the noise floor, if at all. The interpolation calculation necessary to determine the position of the finger between receiver sensor electrodes 130a and 130b in FIG. 1C is therefore highly erroneous.

Continuing on with the description of FIG. 1C, as the finger continues to move further to the right along the X-direction, it passes over the pitch between receiver sensor electrode 130b and receiver sensor electrode 130c. As the finger continues still to move further to the right along the X-direction, it passes over receiver sensor electrode 130c and receiver sensor electrode's 130c crossing over at least one of sensor electrodes 125a, 125b and 125c. A peak signal 135f carried by receiver sensor electrode 130c is shown in the graph directly below the middle of receiver electrode 130c.

Of significance, there is no overlap between the two graphed lines associated with peak signals 135e and 135f, thereby indicating that the signals of neighboring sensors in the interpolation area is near noise floor 142. Again, unlike in FIG. 1B where overlaps 144a and 144b occurred above the noise floor 142, the larger pitch of the sensor in FIG. 1C results in that any overlaps occur below the noise floor, if at all. The interpolation calculation necessary to determine the position of the finger between receiver sensor electrodes 130b and 130c in FIG. 1C is highly erroneous. Thus, increasing the pitch between sensor electrodes results in a loss of accuracy because the $\Delta C_t$ associated with the input object and any group of pixels nearest to the input object becomes less pronounced.

To resolve the situation above in which the interpolation calculation is highly erroneous due to the increase in pitch, the sensor pattern needs to be changed in such a way that the contribution of the neighboring electrodes in the interpolation area becomes significantly greater than noise floor 142. For example, FIG. 1D is an example of a capacitive sensing pattern in accordance with embodiments of the present technology and a sensor electrode response to a finger moving along an X-direction. FIG. 1D shows "U-shaped" receiver sensor electrodes 131a, 131b and 131c. Transmitter sensor electrodes 125a, 125b, 125c, 125d and 125e (hereinafter, "sensor electrodes 125a-125e") are also shown.

The response graph in FIG. 1D shows signal peaks 136a, 136b and 136c directly below the corresponding U-shaped receiver sensor electrodes 131a, 131b and 131c, respectively. Signal peaks 136a, 136b and 136c represent the peak signal carried by receiver sensor electrodes 131a, 131b and 131c, respectively. As a finger moves from the left to the right along the X-direction, it passes over receiver sensor electrode 131a and receiver sensor electrode's 131a two crossings over at least one of sensor electrodes 125a-125e. A peak signal 136a carried by receiver sensor electrode 131a is shown in the graph directly below the middle of receiver electrode 131a. As the finger continues to move further to the right along the X-direction, it passes over the pitch between receiver sensor electrode 131a and receiver sensor electrode 131b.

As the finger continues to move from the left to the right along the X-direction, it passes over receiver sensor electrode 131b and receiver sensor electrode's 131b two crossings over at least one of sensor electrodes 125a-125e. A peak signal 136b carried by receiver sensor electrode 131b is shown in the graph directly below the middle of receiver electrode 131b. Of significance, there is shown an overlap 144a between the two graphed lines associated with peak signals 136a and 136b. Overlap 144a of the signals occurs significantly above the noise floor 142.

Continuing on with the description of FIG. 1D, as the finger continues to move further to the right along the X-direction, it passes over the pitch between receiver sensor electrode 131b and receiver sensor electrode 131c. As the finger continues still to move further to the right along the X-direction, it passes over receiver sensor electrode 131c and receiver sensor electrode's 131c two crossings over at least one of sensor electrodes 125a-125e. A peak signal 136c carried by receiver sensor electrode 131c is shown in the graph directly below the middle of receiver electrode 131c. Of significance, there is shown an overlap 144b between the two graphed lines associated with peak signals 136b and 136c. Overlap 144b of the signals occurs significantly above the noise floor 142.

It should be appreciated that the sensor pattern described in FIG. 1D is an improvement over the sensor pattern described in FIGS. 1B and 1C. The sensor pattern of FIG. 1D enables better detection of an input object due to the greater overlap between the sensor signals 136a, 136b and 136c, when compared to areas of overlap between sensor signals 135a, 135b and 135c shown in FIG. 1B. It should also be appreciated that the sensor electrode pitch shown FIG. 1D is greater than that of FIG. 1B and relatively comparable to the sensor electrode pitch of FIG. 1C. Thus, not only does the sensor pattern in FIG. 1D improve signal response when the sensor pitch is unchanged, as compared to FIG. 1B, but also provides a sensor response that is above the noise floor when the sensor electrode pitch is relatively comparable to the sensor electrode pitch shown in FIG. 1C.

FIG. 1E shows a sensor pattern and a sensor response to a finger moving along an X-direction. In FIG. 1E, the distance between receiver sensor electrodes 131a, 131b and 131c is increased as compared to the distance between receiver sensor electrodes 131a, 131b and 131c of FIG. 1D. In FIG. 1E, only transmitter sensor electrodes 125a, 125b and 125c are shown. As a finger moves from the left to the right along the X-direction, it passes over receiver sensor electrode 131*a* and receiver sensor electrode's 131*a* crossing over at least one of sensor electrodes 125*a*, 125*b* and 125*c*. A peak signal 136*d* carried by receiver sensor electrode 131*a* is shown in the graph directly below the middle of receiver electrode 131*a*. As the finger continues to move further to the right along the X-direction, it passes over the pitch between receiver sensor electrode 131*a* and receiver sensor electrode 131*b*.

As the finger continues to move from the left to the right along the X-direction, it passes over receiver sensor electrode 131*b* and receiver sensor electrode's 131*b* crossing over at least one of transmitter sensor electrodes 125*a*, 125*b* and 125*c*. A peak signal 136*e* carried by receiver sensor electrode 131*b* is shown in the graph directly below the middle of receiver electrode 131*b*. Of significance, there is no overlap between the two graphed lines associated with peak signals 136*d* and 136*e*. The lack of overlap indicates that the signals from the neighboring sensors associated with peak signals 136*d* and 136*e* in the interpolation area are near noise floor 142. In order to determine the precise location of the finger in the interpolation area, at least signals 136*d* and 136*e* are necessary. However, unlike in FIG. 1D where overlaps 144*a* and 144*b* occur above the noise floor 142, the larger pitch of the sensor in FIG. 1E result in that any overlaps occur below the noise floor, if at all. The interpolation calculation necessary to determine the position of the finger between receiver sensor electrodes 131*a* and 131*b* in FIG. 1C is therefore highly erroneous.

To resolve the situation above in which the interpolation calculation is highly erroneous due to the increase in pitch, the sensor pattern needs to be changed in such a way that the contribution of the neighboring electrodes in the interpolation area becomes significantly greater than noise floor 142.

FIG. 1F comprises receiver sensor electrodes 130*a*, 145 and 130*b*, which are interleaved and cross transmitter sensor electrodes 125*a*, 125*b* and 125*c*. Signal peaks 150*a*, 150*b* and 150*c* correspond with the middle portion of receiver sensor electrodes 130*a*, 145 and 130*b*, respectively. These middle portions are of a greater width than any other portion of the same receiver sensor electrode. Signal peaks 155*a* and 160*a*, 160*b* and 160*d*, and 160*c* and 155*b* correspond with the thinner outer portions of receiver sensor electrodes 130*a*, 145 and 130*c*, respectively.

Of note, the signal peaks 150*a*, 150*b* and 150*c* corresponding to the wider middle portions of receiver sensor electrodes 130*a*, 145 and 130*b*, respectively, are greater than the signal peaks 155*a* and 160*a*, 160*b* and 160*d*, and 160*c* and 155*b* corresponding to the thinner outer portions of receiver sensor electrodes 130*a*, 145 and 130*b*, respectively. Also of note, it is not necessary for the any portion of a sensor electrode to be of a different width than any other portion of the same electrode. It is important to note that the signal response from a sensor electrode of a similar shape as 130*a*, 145 and 130*b* yet with a constant width throughout would still exhibit a similar signal response, specifically, a higher signal when an input object is directly over the middle of the electrode.

Referring still to FIG. 1F, as a finger moves from the left to the right along the X-direction, it passes over receiver sensor electrode 130*a* and receiver sensor electrode's 130*a* three crossings over at least one of sensor electrodes 125*a*, 125*b* and 125*c*. A signal 155*a* carried by the left outer portion of receiver sensor electrode 130*a* is shown in the graph directly below the left outer portion of receiver sensor electrode 130*a*. As the finger continues to move further to the right along the X-direction, it passes over the middle portion of receiver sensor electrode 130*a* and receiver sensor electrode's 130*a* second crossings over at least one of transmitter sensor electrodes 125*a*, 125*b* and 125*c*. A signal 150*a* carried by the middle portion of receiver sensor electrode 130*a* is shown in the graph directly below the middle portion of receiver sensor electrode 130*a*.

As the finger continues to move from the left to the right along the X-direction, it passes over the left outer portion of receiver sensor electrode 145 and receiver sensor electrode's 145 first crossings over at least one of transmitter sensor electrodes 125*a*, 125*b* and 125*c*. A signal 160*a* carried by the left outer portion of receiver sensor electrode 145 is shown in the graph directly below the left outer portion of receiver sensor electrode 145. As the finger continues to move from the left to the right along the X-direction, it passes over the right outer portion of receiver sensor electrode 130*a* and receiver sensor electrode's 130*a* third crossings over at least one of transmitter sensor electrodes 125*a*, 125*b* and 125*c*. A signal 160*b* carried by the right outer portion of receiver sensor electrode 130*a* is shown in the graph directly below the right outer portion of receiver sensor electrode 130*a*.

As the finger continues to move from the left to the right along the X-direction, it passes over the middle portion of receiver sensor electrode 145 and receiver sensor electrode's 145 second crossings over at least one of transmitter sensor electrodes 125*a*, 125*b* and 125*c*. A signal 150*b* carried by the middle portion of receiver sensor electrode 145 is shown in the graph directly below the middle portion of receiver sensor electrode 145.

Continuing on with the description of FIG. 1F, as the finger continues to move further to the right along the X-direction, it passes over the left outer portion of receiver sensor electrode 130*b* and receiver sensor electrode's 130*b* first crossings over at least one of transmitter sensor electrodes 125*a*, 125*b* and 125*c*. A signal 160*c* carried by the left outer portion of receiver sensor electrode 130*b* is shown in the graph directly below left outer portion of receiver sensor electrode 130*b*. As the finger continues to move further to the right along the X-direction, it passes over the right outer portion of receiver sensor electrode 145 and receiver sensor electrode's 145 third crossings over at least one of transmitter sensor electrodes 125*a*, 125*b* and 125*c*. A signal 160*d* carried by the right outer portion of receiver sensor electrode 145 is shown in the graph directly below right outer portion of receiver sensor electrode 145.

As the finger continues to move from the left to the right along the X-direction, it passes over the middle portion of receiver sensor electrode 130*b* and receiver sensor electrode's 130*b* second crossings over at least one of transmitter sensor electrodes 125*a*, 125*b* and 125*c*. A signal 150*c* carried by the middle portion of receiver sensor electrode 130*b* is shown in the graph directly below the middle portion of receiver sensor electrode 130*b*. As the finger continues to move further to the right along the X-direction, it passes over the right outer portion of receiver sensor electrode 130*b* and receiver sensor electrode's 130*b* third crossings over at least one of transmitter sensor electrodes 125*a*, 125*b* and 125*c*. A signal 155*b* carried by the right outer portion of receiver sensor electrode 130*b* is shown in the graph directly below right outer portion of receiver sensor electrode 130*b*.

Significantly and as shown in FIG. 1F, due to the configuration of the capacitive sensing pattern in which each receiver sensor electrode has a portion in the domain of its neighboring receiver sensor electrode, lines associated with signals overlap significantly above floor noise 142. Thus, the capacitive sensing pattern of FIG. 1F which comprises sensor electrodes with a larger pitch than the sensor electrodes in FIG. 1D and relatively comparable pitch to FIG. 1E, enables an accurate interpolation calculation.

It is of note, that the signal responses 135*a-f*, 136*a-f*, 150*a-c*, 155*a-b*, and 160*a-d* of FIGS. 1B-F are shown in a matter as to best explain the benefits of the sensor design in accordance with the present technology. It should be noted that the signal responses may vary significantly from the examples described, depending but not limited to the design of the sensor pattern, the type of sensing scheme used, algorithms used to process the electronic signals, finger size, etc.

The following discussion will begin with a detailed description focused on aspects of the structure in accordance with the present technology. This discussion will then be followed by a detailed description focused on aspects of the operation in accordance with the present technology.

Example Capacitive Sensing Pattern in a Mutual Capacitance Sensor

FIG. 1A is a block diagram of an example sensor electrode pattern 100 within a mutual capacitance sensor in accordance with embodiments of the present technology. In one embodiment, sensor electrode pattern 100 comprises a plurality of first sensor electrodes 105*a*, 105*b*, 105*c*, 105*d*, 105*e*, 105*f*, 105*g*, 105*h* and 105*i* (hereinafter, "105*a*-105*i*") oriented along a first axis and a plurality of second sensor electrodes 110*a*, 110*b*, 110*c*, 110*d*, 110*e*, 110*f*, 110*g*, 110*h*, 110*i*, 110*j*, 110*k* and 110*l* (hereinafter, "110*a*-110*l*") oriented along a second axis. It should be appreciated that the sensor electrode pattern 100 may comprise more or less sensor electrodes than those indicated by FIG. 1A. Furthermore, in one embodiment, the plurality of first sensor electrodes may comprise 110*a*-110*l* and the plurality of second sensor electrodes may comprise 105*a*-105*i*. The plurality of first sensor electrodes 105*a*-105*i* and the plurality of second sensor electrodes 110*a*-110*l* are disposed proximate to a sensing region of a mutual capacitance sensor.

In one embodiment, the plurality of first sensor electrodes 105*a*-105*i* is oriented along a first axis 102. The plurality of second sensor electrodes 110*a*-110*l* is oriented along a second axis 104. It should be appreciated that the first axis 102 and the second axis 104 may be positioned in any direction that is different from each other.

In one embodiment of the present technology, at least one sensor electrode of the plurality of first sensor electrodes 105*a*-105*i* is disposed in a configuration forming multiple crossings with a line that is parallel to the second axis 104. The term "multiple crossings" refers to more than one point of intersection within a sensing regions between a sensor electrode oriented substantially parallel to one axis and a line parallel to a second axis, which is substantially non-parallel to the first axis. For example, sensor electrode 105*d* along first axis 102 forms multiple crossings with a line that is parallel to the second axis 104 (e.g. a line traced substantially along electrode 110*e* within the sensing region). These multiple crossings occur proximate to the sensing region of the mutual capacitance sensor. In one embodiment, at least two of the plurality of first sensor electrodes 105*a*-105*i* are interleaved with each other proximate to the sensing region of the mutual capacitance sensor.

Moreover, in one embodiment, one of the plurality of first sensor electrodes 105*a*-105*i* and the plurality of second sensor electrodes 110*a*-110*l* comprises transmitter sensor electrodes and the other one of the plurality of first sensor electrodes 105*a*-105*i* and the plurality of second sensor electrodes 110*a*-110*l* comprises receiver sensor electrodes. Furthermore, sensing electrode pattern 100 may include a routing trace, shown as 120 as an example of the plurality of routing traces shown in FIG. 1A to be coupled with the plurality of sensor electrodes 105*a*-105*i*.

In one embodiment, the sensor electrode pattern 100 comprises a plurality of receiver sensor electrodes configured to be oriented substantially parallel to the first axis 102, wherein at least two of the plurality of receiver sensor electrodes are interleaved proximate to the sensing region of the mutual capacitance sensor. For example, the plurality of first sensor electrodes 105*a*-105*i* may be receiver sensor electrodes oriented substantially parallel to the first axis 102. At least two, 105*a* and 105*b*, of the plurality of receiver sensor electrodes 105*a*-105*i* are interleaved proximate to the sensing regions of the mutual capacitance sensor.

In another embodiment, sensor electrode pattern 100 comprises a plurality of transmitter sensor electrodes oriented substantially parallel to a second axis and configured to be capacitively coupled with the plurality of receiver sensor electrodes. For example, the plurality of sensor electrodes 110*a*-110*l* may be transmitter sensor electrodes oriented substantially parallel to the second axis 104 and are capacitively coupled with the receiver sensor electrodes 105*a*-105*i*.

While FIG. 1A depicts the plurality of first sensor electrodes 105*a*-105*i* as being straight and substantially parallel to each other, it should be appreciated that a portion of the plurality of first sensor electrodes 105*a*-105*i* may be positioned in a zig-zagging pattern and be substantially parallel to each other.

In another embodiment, sensor electrode pattern 100 is configured to be placed in front of a display (i.e. between the display and a user's line of sight) such that at least one of the first axis and second axis is angled with respect to the display. In yet another embodiment, sensor electrode patter 100 may include an optical coating.

Figure 2A:
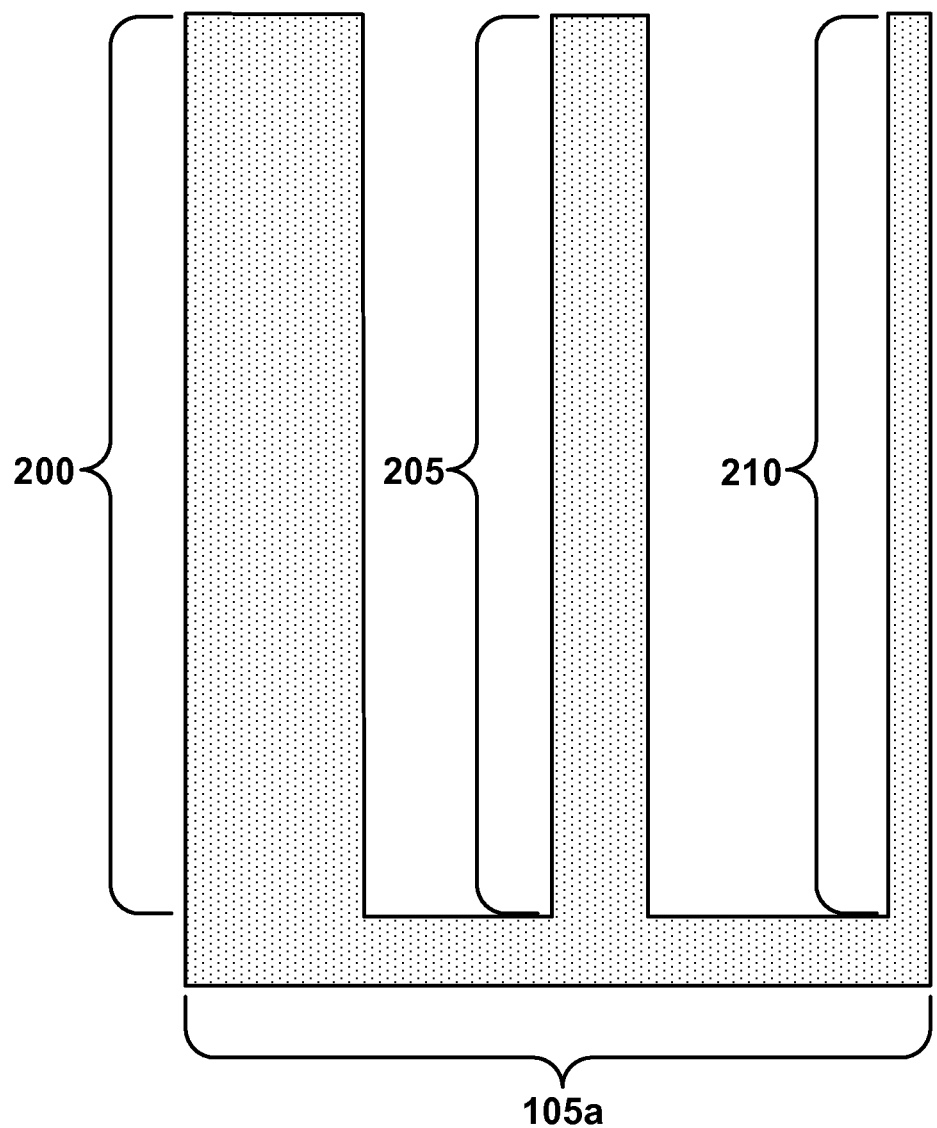
FIG. 2A is a block diagram of an example sensor electrode in accordance with embodiments of the present technology.

FIG. 2A is a block diagram of an example sensor electrode of capacitive sensing pattern 100 in accordance with embodiments of the present technology. In one embodiment, at least one sensor electrode of the plurality of first sensor electrodes 105*a*-105*i* and the plurality of second sensor electrodes 110*a*-110*l* has portions of different widths. For example, sensor electrode 105*a* of FIG. 2A comprises the portions 200, 205 and 210, which are all of different widths. It should be appreciated that a sensor electrode may have some portions of the same width and other portions of different widths. For example, in one embodiment, the portions 200 and 205 may be of the same width and the portion 210 may be of a different width from the portions 200 and 205.

In one embodiment, the sensor electrode 105*a* may be referred to as an "intrudable sensor electrode" when at least a portion of sensor electrode 105*a* defines a fillable two-dimensional area. This area occurs proximate to the sensing region of the mutual capacitance sensor. For example, the area between the portion 200 and the portion 205 constitutes a fillable two-dimensional area. Additionally, in one embodiment, at least one sensor electrode of the plurality of first sensor electrodes 105*a*-105*i* is an intrudable sensor electrode. Of note, the sensor electrodes 110*a*-110*l* of FIG. 1A are shown to be straight bars for clarity and brevity in the description of embodiments of the present technology. However, it should be understood that the sensor electrodes 110-110*l* may also be configured to be intrudable sensor electrodes like the sensor electrodes 105*a*-105*i* of FIG. 1A.

Furthermore, as shown in FIG. 2A, in one embodiment, at least one portion of the intrudable sensor electrode 105*a* is of a different width than another portion of the intrudable sensor electrode 105*a*. For example, the portion 200 of intrudable sensor electrode 105*a* is of a different width than the portion 205 of the intrudable sensor electrode 105*a*.

Figure 2B:
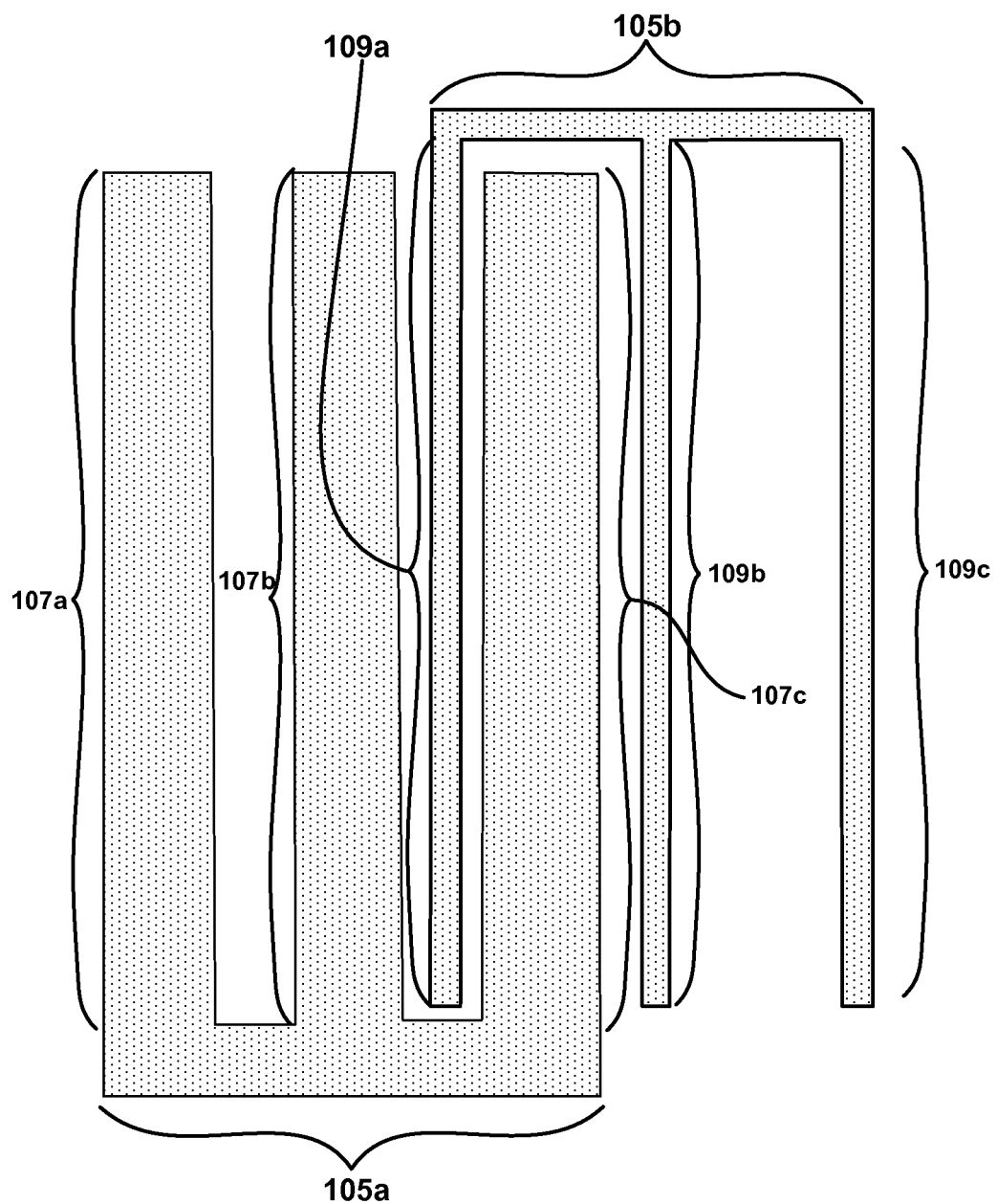
FIG. 2B is a block diagram of example sensor electrodes in accordance with embodiments of the present technology.

FIG. 2B is a block diagram of example sensor electrodes of the capacitive sensing pattern 100 in accordance with embodiments of the present technology. In one embodiment, at least two sensor electrodes of the plurality of first sensor electrodes 105a-105i differ in width or at least two sensor electrodes of the plurality of second sensor electrodes 110a-110l differ in width. For example, FIG. 2B shows the sensor electrodes 105a and 105b of the plurality of first sensor electrodes 105a-105i differing in width. The portions 107a, 107b and 107c of the sensor electrode 105a have a different width than the portions 109a, 109b and 109c of the sensor electrode 105b. It should be appreciated that while FIG. 2B shows the portions 107a, 107b and 107c having the same width, 107a, 107b and 107c may have different widths (as shown in FIG. 2A). Similarly, while FIG. 2B shows portions 109a, 109b and 109c having the same width, 109a, 109b and 109c may have different widths (as shown in FIG. 2A).

Furthermore, as already described herein, in one embodiment, a sensor electrode may be referred to as an "intrudable sensor electrode". In one embodiment, and referring still to FIGS. 1A and 2B, at least one sensor electrode of the plurality of second sensor electrodes 110a-110l may be a second intrudable electrode (not shown in FIG. 1A). However, FIG. 2C (described below) shows an example of at least one sensor electrode of the plurality of second sensor electrodes 110a-110l being a second intrudable sensor electrode.

Figure 2C:
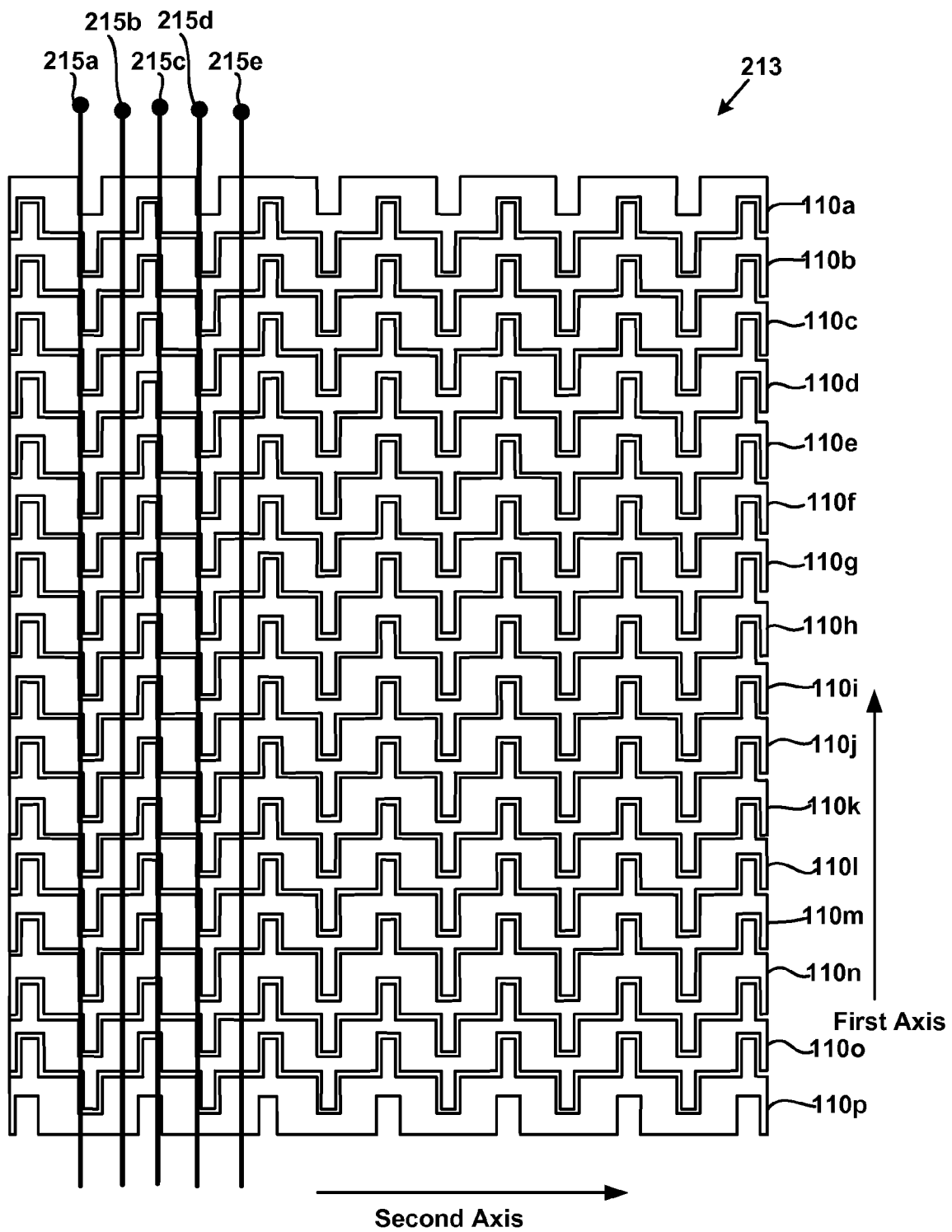
FIG. 2C is a block diagram of an example sensor electrode pattern in accordance with embodiments of the present technology.

FIG. 2C is a block diagram of an example capacitive sensing pattern 213 in accordance with embodiments of the present technology. The capacitive sensing pattern 213 comprises a plurality of first sensor electrodes 215a, 215b, 215c, 215d and 215e (hereinafter, "215a-215e") and a plurality of second sensor electrodes 110a, 110b, 110c, 110d, 110e, 110f, 110g, 110h, 110i, 110j, 110k, 110l, 110m, 110n, 110o, 110p (hereinafter, "110a-110p"). The plurality of second sensor electrodes 110a-110p are intrudable sensor electrodes because each defines a fillable two-dimensional area. In one embodiment, some of the plurality of first sensor electrodes 215a-215e cover the gaps created in the interleaved regions of the plurality of second sensor electrodes 110a-110p while crossing over or under the plurality of second sensor electrodes 110a-110p. For example, sensor electrode 215a covers all of the gaps created in the interleaved regions along its pathway between sensor electrodes 110a and 110p. However, sensor electrode 215b does not cover any of the gaps created in the interleaved regions along its pathway between the sensor electrodes 110a and 110p.

It should be appreciated that the plurality of first sensor electrodes 215a-215e may be positioned so that all of the plurality of first sensor electrodes 215a-215e cover all of the gaps created in the interleaved regions along their pathways between the sensor electrodes 110a and 110p. Additionally, the plurality of first sensor electrodes 215a-215e may be positioned so that none of the plurality of first sensor electrodes 215a-215e cover any of the gaps created in the interleaved regions along their pathways between the sensor electrodes 110a and 110p.

Figure 3A:
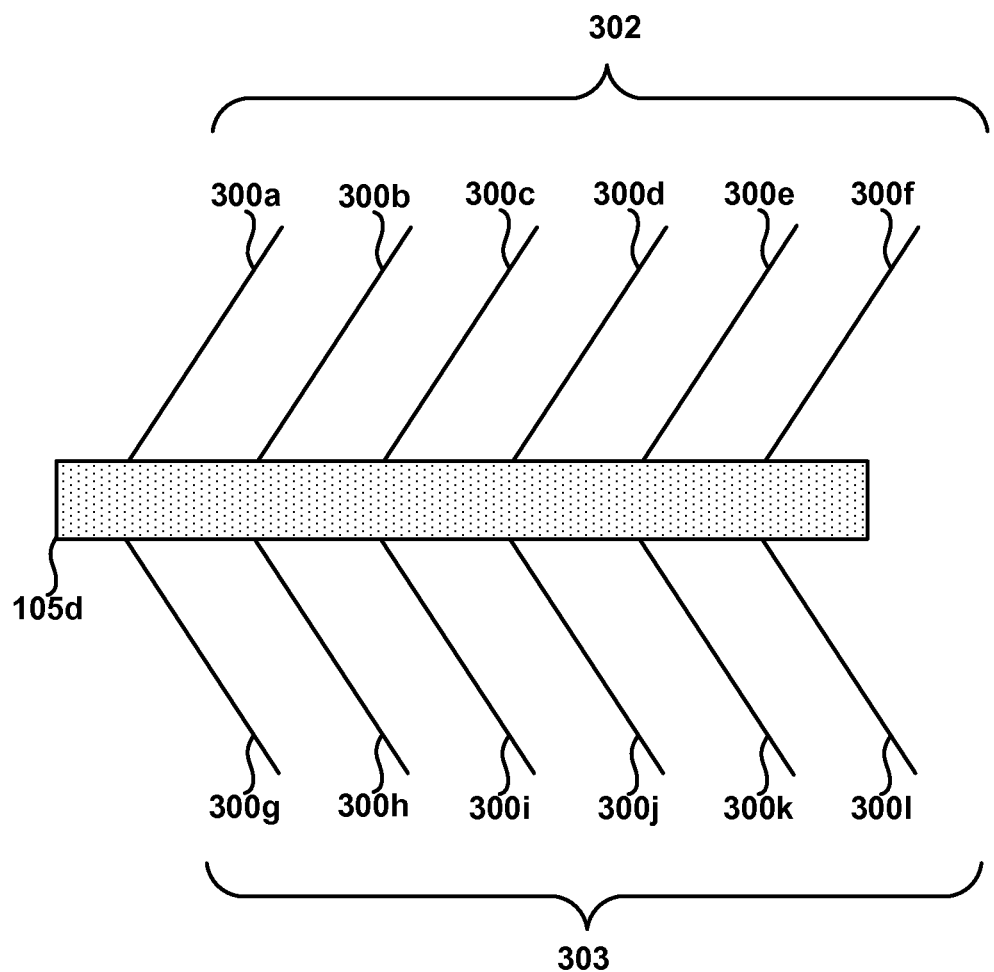
FIG. 3A is a block diagram of an example sensor electrode of a sensor electrode pattern in accordance with embodiments of the present technology.

FIG. 3A is a block diagram of an example sensor electrode of a capacitive sensing pattern in accordance with embodiments of the present technology. In one embodiment, capacitive sensing pattern 100 comprises at least one sensor electrode 105d of FIG. 1A of the pluralities of first sensor electrodes 105a-105i and the second sensor electrodes 110a-110l. The sensor electrode 105d comprises one or more sets of a plurality of extensions. For example, FIG. 3A shows two sets of extension, 302 and 303. Set of extensions 302 comprises extensions 300a, 300b, 300c, 300d, 300e and 300f (hereinafter, "300a-f"). Set of extensions 303 comprises extensions 300g, 300h, 300i, 300j, 300k and 300l (hereinafter, "300g-300l"). It should be understood that while the set of extensions 302 and 303 are depicted as thin lines, these extensions may be of varying widths.

The plurality of extensions within each set of the one or more sets are substantially parallel to each other. For example, the plurality of extensions 300a-300f of set of extensions 302 are substantially parallel to each other. In this context, the term "substantially parallel" refers to each extension of a plurality of extensions being positioned parallel to or close to parallel to each other. Similarly, the plurality of extensions 300g-300l of set of extensions 303 are substantially parallel to each other. It should be appreciated that set of extensions 300a-300f and 300g-300l may be positioned at any angle to sensor electrode 105d. For example, sensor electrode extensions 300a-300f may be positioned perpendicular to sensor electrode 105d or at an angle that is non-perpendicular to sensor electrode 105d.

Figure 3B:
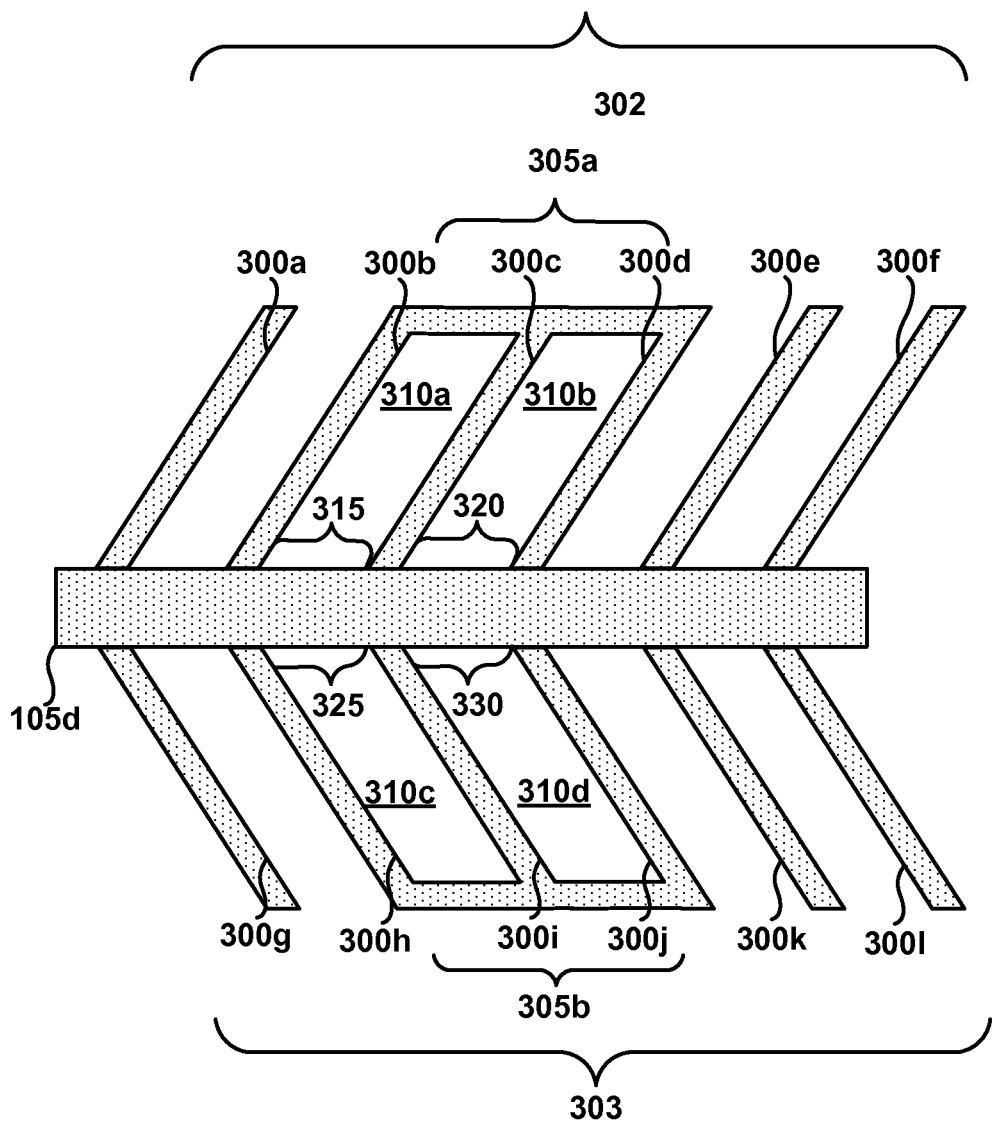
FIG. 3B is a block diagram of an example sensor electrode of a sensor electrode pattern in accordance with embodiments of the present technology.

FIG. 3B is a block diagram of an example sensor electrode of a capacitive sensing pattern, in accordance with embodiments of the present technology. As in FIG. 3A, the capacitive sensing pattern of FIG. 3B comprises at least one sensor electrode 105d of the pluralities of first sensor electrodes 105a-105i and second sensor electrodes 110a-110l of FIG. 1A. The sensor electrode 105d comprises at least one extension coupler configured for coupling at least two extensions of the one or more sets of the plurality of extensions 302, thereby providing an area bounded by the sensor electrode 105d of the pluralities of the first and second sensor electrodes, 105a-105i and 110a-110l, respectively. For example, extension coupler 305a couples extensions 300b, 300c and 300d. Similarly, extension coupler 305b couples extensions 300h, 300i and 300j.

The area that is bounded by the sensor electrode 105d in FIG. 3B, using the extension coupler 305a is the area 310a. For example, the extensions 300b and 300c, a portion of the extension coupler 305a and a surface 315 of a portion of the sensor electrode 105d bound area 310a. This bounded area is a gap between portions of the sensor electrode 105d, and can be described as a "window". Similarly, the extensions 300c and 300d, a portion of extension coupler 305a and a surface 320 of a portion of the sensor electrode 105d bound area 310b. The extensions 300h and 300i, a portion of extension coupler 305b and a surface 325 of a portion of the sensor electrode 105d bound area 310c. The extensions 300i and 300j, a portion of the extension coupler 305b and a surface 330 of a portion of the sensor electrode 105d bound area 310d.

Figure 3C:
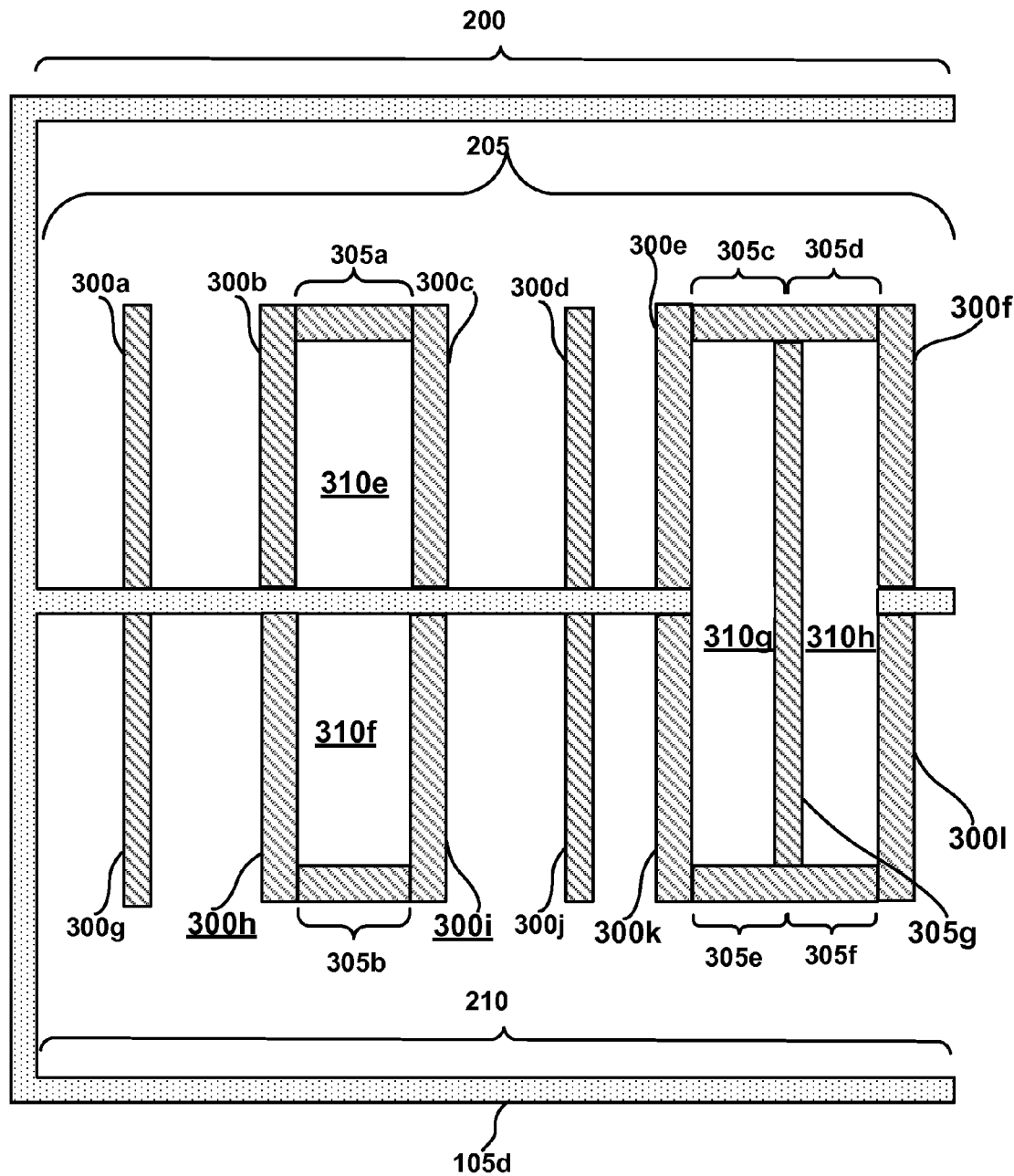
FIG. 3C is a block diagram of an example sensor electrode of a sensor electrode pattern in accordance with embodiments of the present technology.

FIG. 3C is a block diagram of an example sensor electrode of a capacitive sensing pattern in accordance with embodiments of the present technology. In one embodiment, the sensor electrode 105d is a sensor electrode with three portions, 200, 205 and 210, as is shown in FIG. 2A. The sensor electrode 105d of FIG. 3C comprises extensions 300a, 300b, 300c, 300d, 300e, 300f, 300g, 300h, 300i, 300j, 300k and 300l. However, the extension coupler 305a couples the extensions 300b and 300c to form a bounded area 310e. The extension coupler 305b couples the extensions 300h and 300i to form a bounded area 310f. The extension couplers 305c, 305e and 305g couple with the extensions 300e and 300k to form a bounded area 310g. Similarly, the extension couplers 305d, 305f and 305g couple with the extensions 300f and 300l to form a bounded area 310h.

It should be understood that the bounded areas and their surrounding extensions and extension couplers may occur in any position relative to sensor electrode 105d and on any portion of sensor electrode 105d. Furthermore, it should be understood that extensions and extension couplers can be formed to be one and the same feature. Furthermore, as was described herein, it should be understood that extensions and extension couplers may be embodied as features of receiver and/or transmitter sensor electrodes.

While FIGS. 3A, 3B and 3C depict extensions that are straight, it should be appreciated that portions of some or all of the extensions may be rounded. For example and referring to FIG. 3C, extensions 300b and 300c may be rounded and meet at their respective ends to form a circular shape that entirely encloses a defined area. In another embodiment, extensions 300b and 300c may be rounded, but not meet at their respective ends and not entirely enclose a defined area. Furthermore, it should be appreciated that portions of some or all extension couplers may also be rounded.

Figure 4:
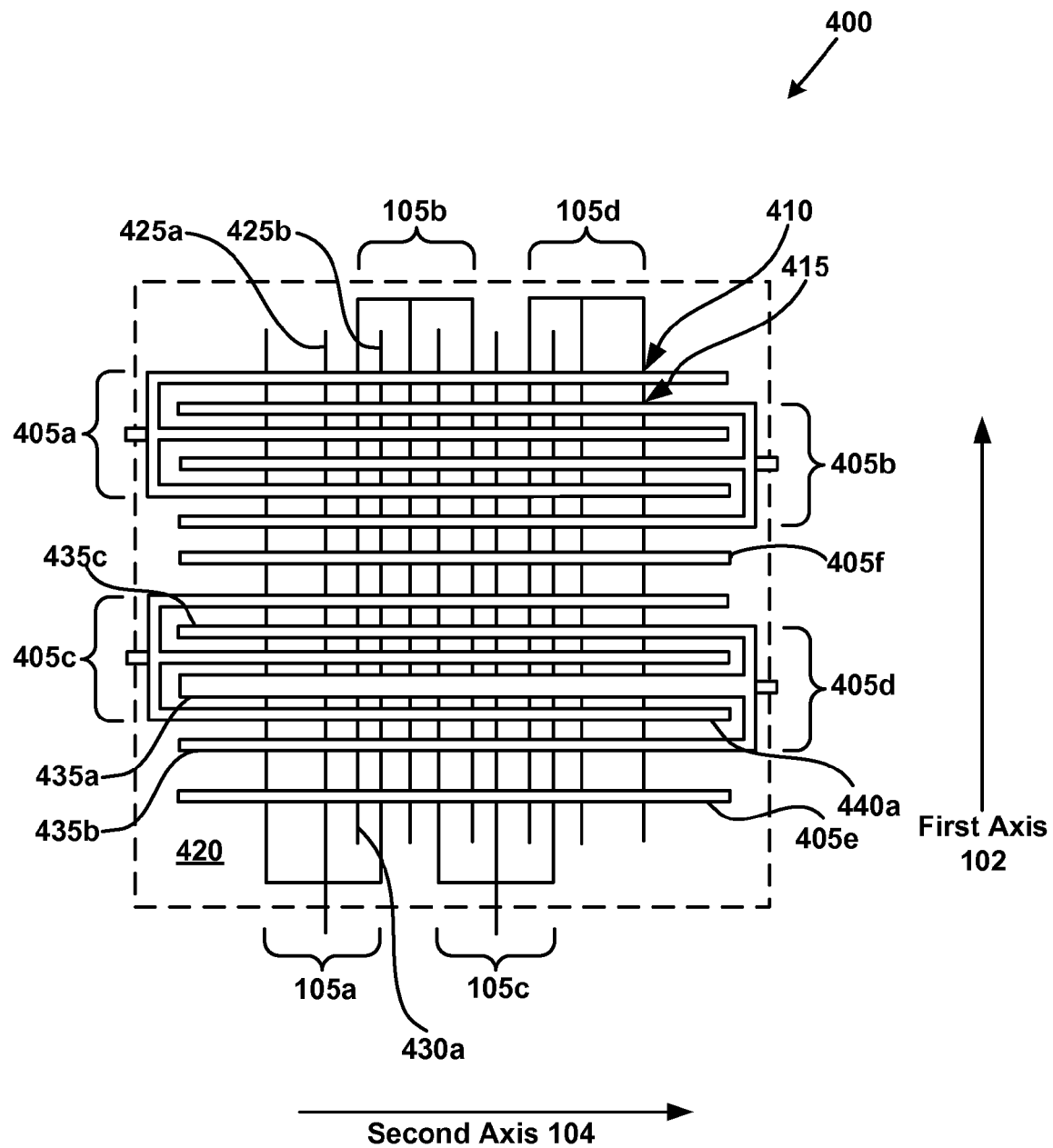
FIG. 4 is a block diagram of an example sensor electrode pattern in accordance with embodiments of the present technology.

FIG. 4 is a block diagram of an example capacitive sensing pattern 400 in accordance with embodiments of the present technology. The capacitive sensing pattern 400 comprises at least two of the plurality of the first sensor electrodes 105a, 105b, 105c and 105d (hereinafter, "105a-105d") interleaved with each other and at least two of the plurality of the second sensor electrodes 405a, 405b, 405c, 405d, 405e and 405f (hereinafter, "405a-405f") interleaved with each other. As described herein, the term "interleaved" refers to a sensor electrode filling a two-dimensional fillable space provided by another sensor electrode. For example, the sensor electrode 105a is interleaved with the sensor electrode 105b. The portion 430a of the sensor electrode 105b fills the two dimensional fillable space provided by the portions 425a and 425b of the sensor electrode 105a. Similarly, the sensor electrode 405c is interleaved with the sensor electrode 405d. The portion 440a of the sensor electrode 405c fills the two dimensional fillable space provided by the portions 435a and 435b of the sensor electrode 405d. Furthermore, the first plurality of the sensor electrodes 105a-105d and the second plurality of the sensor electrodes 405a-405d comprise footprint 420.

Of note, the plurality of the first sensor electrodes 105a-105d are oriented along the first axis 102. The plurality of the second sensor electrodes 405a-405f are oriented along the second axis 104. Additionally, as is described with reference to FIGS. 2A and 2B, portions of a sensor electrode may be wider than other portions of that same sensor electrode. For example, the portion 435a of the sensor electrode 405d is wider than the portions 435b and 435c.

In one embodiment and still referring to FIG. 4, at least one sensor electrode of the plurality of second sensor electrodes 405a-405f is disposed in a configuration forming multiple crossings with a line that is parallel to the first axis 102. For example, the sensor electrode 405a of the plurality of second sensor electrodes 405a-405d forms multiple crossings, for example crossings at 410 and 415, with a line that is parallel to the first axis 102.

Referring still to FIG. 4, in yet another embodiment, at least one sensor electrode comprises first and second parallel portions substantially along the first axis traversing across most of a footprint of the sensing region, or at least one sensor electrode of the plurality of second sensor electrodes comprises first and second parallel portions traversing substantially along the second axis across most of the footprint. For example, at least one sensor electrode 105a comprising the first 425a and the second 425b parallel portions substantially along the first axis 102 traversing across most of the footprint 420 of the sensing region or at least one sensor electrode 405d of the plurality of second sensor electrodes 405a-405d comprises the first 435a and the second 435b portions traversing substantially along the second axis 104 across most of the footprint 420.

Referring still to FIG. 4, in one embodiment, the sensor electrode 405d of the plurality of second sensor electrodes 405a-405f has a portion 435a that is wider than the portions 435b and 435c of sensor electrode 405d. The sensor electrode 405d is positioned such that an input object's proximity to the sensor electrode 405d creates a stronger mutual capacitance change in portion 435a than in the thinner portions 435b and 435c.

In another embodiment, a capacitive sensing pattern may comprise a guard sensor electrode proximate to the pluralities of the first and second sensor electrodes. For example, the capacitive sensing pattern 400 may comprise a guard sensor electrode 405e proximate to the pluralities of the first and the second sensor electrodes 105a-105d and 405a-405d, respectively. It should be noted that a guard electrode 405e may be located outside yet proximate to the footprint 420.

Figure 5:
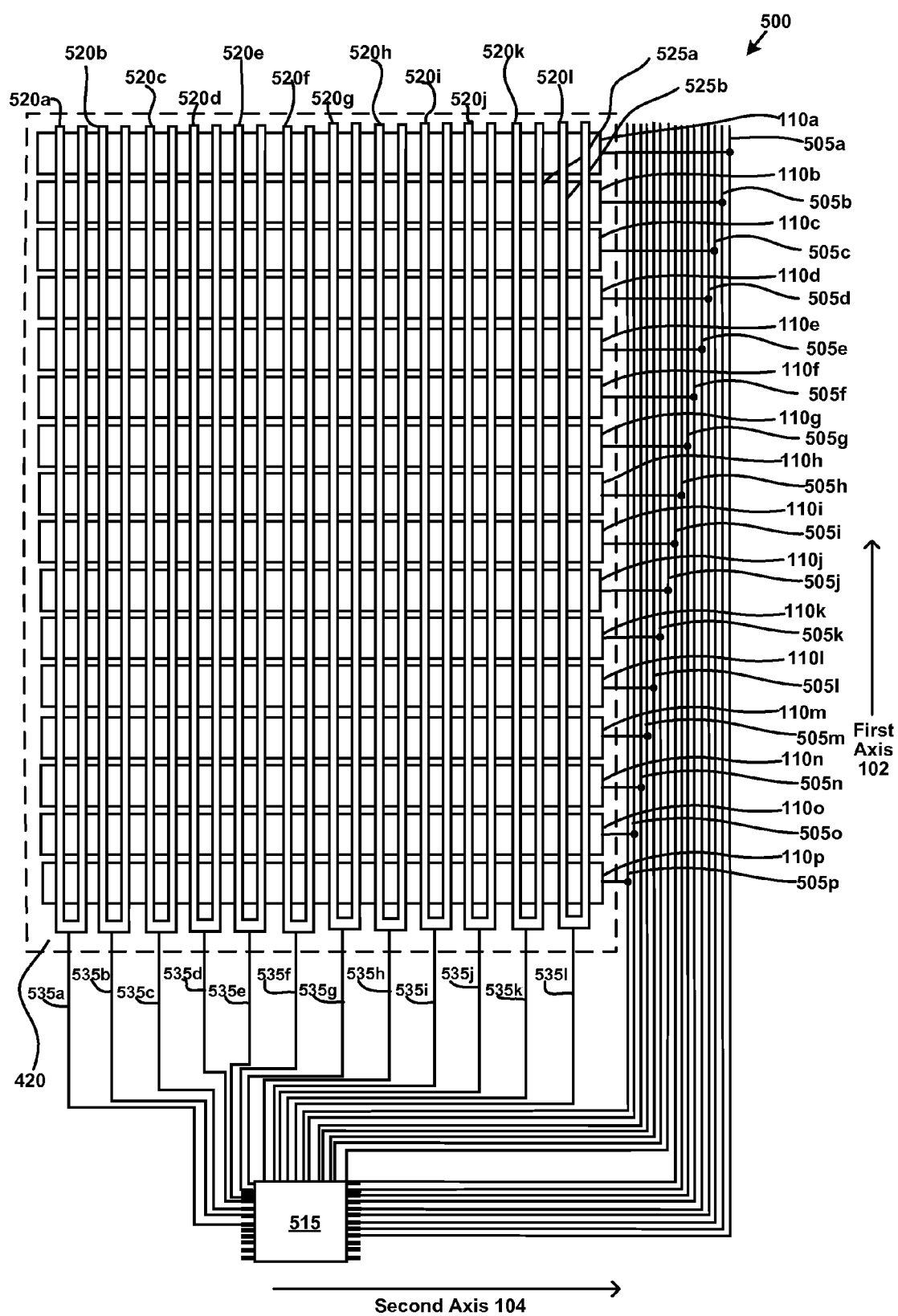
FIG. 5 is a block diagram of an example sensor electrode pattern coupled with mutual capacitance sensing circuitry in accordance with embodiments of the present technology.

FIG. 5 is a block diagram of an example mutual capacitance sensing apparatus 500 comprising mutual capacitance sensing circuitry 515 in accordance with embodiments of the present technology. Mutual capacitance sensing apparatus 500 also comprises a plurality of first sensor electrodes oriented substantially parallel to a first axis proximate to a sensing region of a mutual capacitance sensor and coupled with mutual capacitance sensing circuitry 515. For example, mutual capacitance sensing apparatus 500 comprises a plurality of first sensor electrodes 520a, 520b, 520c, 520d, 520e, 520f, 520g, 520h, 520i, 520j, 520k and 520l (hereinafter, "520a-520l") oriented substantially parallel to a first axis 102 proximate to a sensing region of a mutual capacitance sensor and coupled with the mutual capacitance sensing circuitry 515.

The mutual capacitance sensing apparatus 500 also comprises a plurality of second sensor electrodes oriented substantially parallel to a second axis proximate to the sensing region and configured to be capacitively coupled with the plurality of first sensor electrodes. For example, mutual capacitance sensing apparatus 500 comprises plurality of second sensor electrodes 110a, 110b, 110c, 110d, 110e, 110f, 110g, 110h, 110i, 110j, 110k, 110l, 110m, 110n, 110o and 110p (hereinafter, "110a-110p") oriented substantially parallel to a second axis 104 proximate to the sensing region and are capacitively coupled with the plurality of the first sensor electrodes 520a-520l.

Further, in one embodiment, at least one sensor electrode of the plurality of first sensor electrodes 520a-520l is disposed in a configuration forming multiple crossings with a line that is parallel to the second axis 104, the multiple crossings occurring proximate to the sensing region. Furthermore, one of plurality of first sensor electrodes 520a-520l and the plurality of second sensor electrodes 110a-110p comprises transmitter sensor electrodes and the other one of plurality of first sensor electrodes 520a-520l and the plurality of second sensor electrodes 110a-110p comprises receiver sensor electrodes.

While FIG. 5 shows that the plurality of first sensor electrodes 520a-520l are not interleaved with each other and the plurality of second sensor electrodes 110a-110p are not interleaved with each other, it should be noted that at least two sensor electrodes of the plurality of first sensor electrodes 520a-520l or at least two sensor electrodes of the plurality of second sensor electrodes 110a-110p may be interleaved with each other proximate to the sensing region of the mutual capacitance sensor, such as is shown in FIG. 4 with the plurality of first sensor electrodes 105a-105d and the plurality of second sensor electrodes 405a-405f.

In one embodiment, all of the plurality of first sensor electrodes 520a-520l or all of the plurality of second sensor electrodes 110a-110p are coupled with routing traces 535a, 535b, 535c, 535d, 535e, 535f, 535g, 535h, 535i, 535j, 535k and 535l (hereinafter, "535a-535l") and 500a, 500b, 500c, 500d, 500e, 500f, 500g, 500h, 500i, 500j, 500k, 500l, 500m, 500n, 500o and 500p (hereinafter, "500a-500p"), respectively.

In one embodiment, all of routing traces 535a-535l associated with a plurality of sensor electrodes oriented along an axis are positioned on one side of the footprint 420. In another embodiment, the routing traces 535a-535l associated with a plurality of sensor electrodes oriented along an axis may be positioned on more than one side of the footprint 420.

Therefore, embodiments of the present technology enable accurate detection of input objects when the pitch of the sensor electrodes is increased.

Operation

In embodiments in accordance with the present technology, the capacitive sensing pattern enables the use of large pitches between sensor electrodes and more accurate detection of multiple input objects concurrently disposed in a sensing region of a mutual capacitance sensor.

Figure 6:
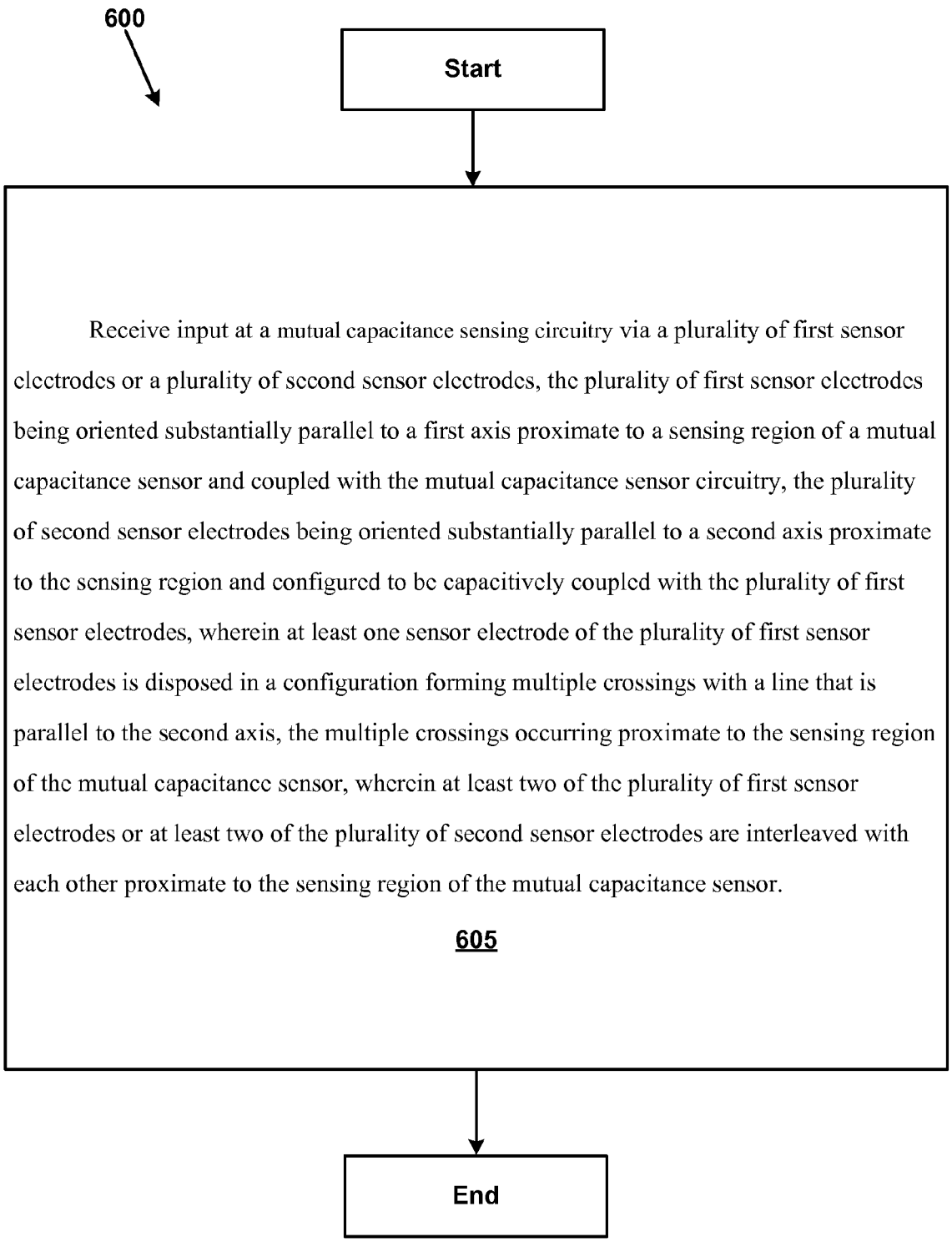
FIG. 6 is a flowchart of an example method for detecting multiple input objects concurrently disposed in a sensing region of a mutual capacitance sensor in accordance with embodiments of the present technology.

FIG. 6 is a flowchart of an example method 600 for detecting multiple input objects concurrently disposed in a sensing region of a mutual capacitance sensor in accordance with embodiments of the present technology.

Referring to 605 of FIG. 6 and to FIGS. 1 and 5, in one embodiment, input is received at the mutual capacitance sensing circuitry 515 via the plurality of first sensor electrodes 520a-520l and the plurality of second sensor electrodes 110a-110p. As described herein, the plurality of first sensor electrodes 520a-520l are oriented substantially parallel to the first axis 102 proximate to a sensing region of a mutual capacitance sensor and are coupled with the mutual capacitance sensing circuitry 515. Further, the plurality of second sensor electrodes 110a-110p are oriented substantially parallel to the second axis 104 proximate to the sensing region and are configured to be capacitively coupled with the plurality of first sensor electrodes 520a-520l. At least one sensor electrode of the plurality of first sensor electrodes 520a-520l is disposed in a configuration forming multiple crossings with a line that is parallel to the second axis 104. The multiple crossings occur proximate to the sensing region of the mutual capacitance sensor, wherein at least two of the plurality of first sensor electrodes 520a-520l or at least two of the plurality of second sensor electrodes 110a-110p are interleaved with each other proximate to the sensing region of the mutual capacitance sensor.

The mutual capacitance sensing circuitry 515 receives input in the form of signals when an input object is placed on or proximate to a sensor electrode of a mutual capacitance sensor. These signals are associated with the "pixel capacitance", $C_t$. Mutual capacitance sensing circuitry 515 then may calculate changes in the value of the "pixel capacitance" to find the input object's location in a sensing region.

Figure 7:
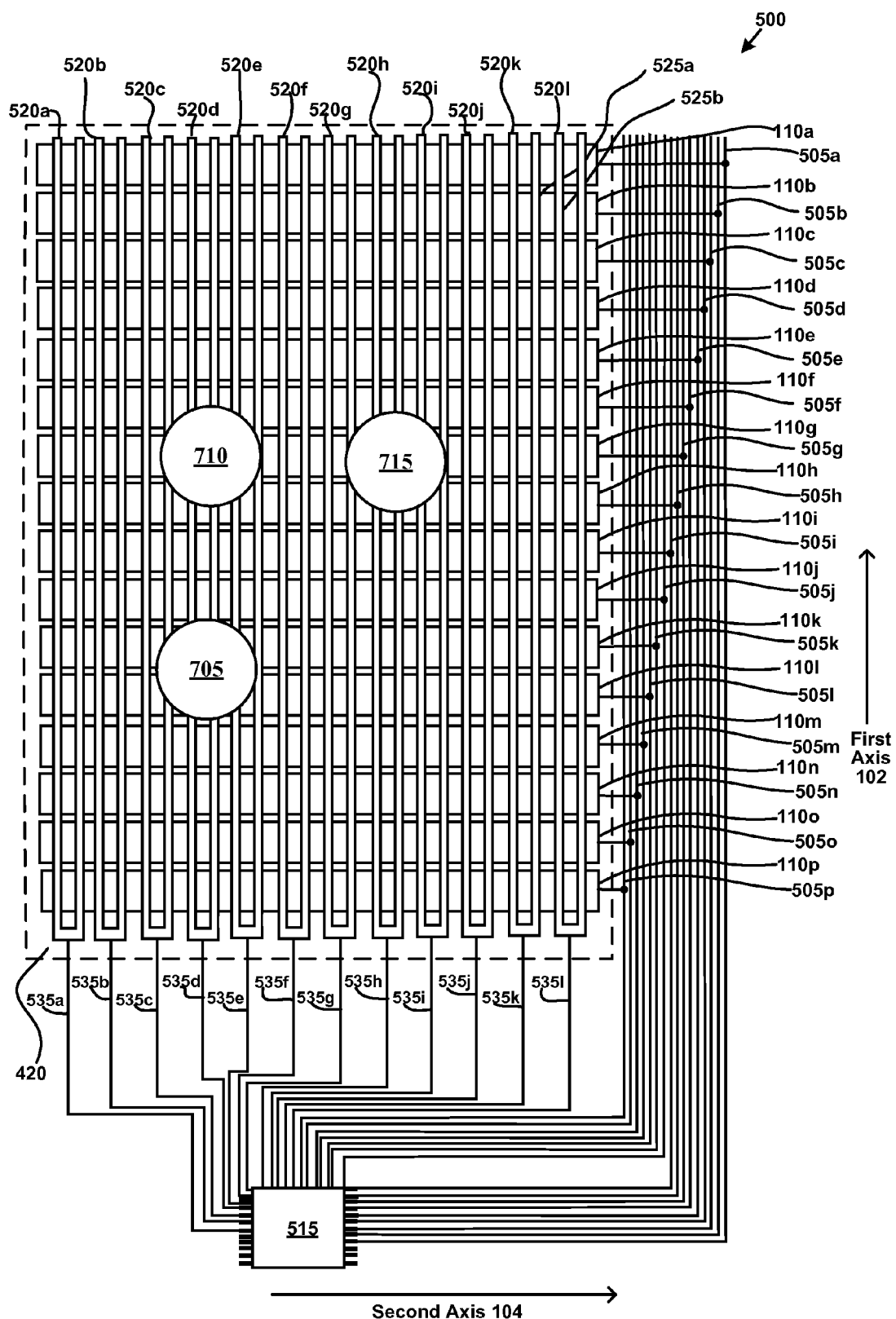
FIG. 7 is a block diagram of an example sensor electrode pattern coupled with mutual capacitance sensing circuitry in accordance with embodiments of the present technology.

For example and referring to FIG. 7, a block diagram of an example capacitive sensing pattern 500 coupled with mutual capacitance sensing circuitry 515 in accordance with embodiments of the present technology is shown. Three input objects, 705, 710 and 715 are shown as positioned upon the first plurality of sensor electrodes 520a-520l and the second plurality of sensor electrodes 110a-110p. In one embodiment, the first plurality of sensor electrodes 520a-520l are receiver sensor electrodes, while the second plurality of sensor electrodes 110a-110p are transmitter sensor electrodes. However, as described herein, it is understood that in another embodiment, the first plurality of sensor electrodes 520a-520l may be transmitter sensor electrodes, while the second plurality of sensor electrodes 110a-110p may be receiver sensor electrodes.

In particular, input object 705 is placed on some portion of sensor electrodes 520c, 520d and 520e as well as 110j, 110k and 110l. The pixels corresponding to the crossing of the sensor electrode 520d and the sensor electrodes 110k and 110l show the largest $\Delta C_t$ since the entire pixel is covered by the input object 705. However, the pixels corresponding to the crossing of the sensor electrode 520c and the sensor electrodes 110k and 110l show a much smaller $\Delta C_t$ since only a portion of the pixels are covered by the input object 705. Likewise, the pixels corresponding to the crossing of the sensor electrode 520e and the sensor electrodes 110l and 110l also show a much smaller $\Delta C_t$ since only a portion of the pixels are covered by the input object 705. As explained in FIGS. 1B-F and with reference to the method discussed for interpolating the signal relative to an input object's proximity to a pixel, the location of the input object 705 can be determined to be relatively centered in the region surrounding the pixels with the largest $\Delta C_t$, and corresponding to the intersection of the sensor electrode 520d and the sensor electrodes 110k and 110l.

In one embodiment, the greater the $\Delta C_t$ measured at a pixel, the more likely that the mutual capacitance sensing circuitry 515 is to "detect" the cause of the measured $\Delta C_t$ to be an input object. In another embodiment, the mutual capacitance sensing circuitry 515 is configured to recognize as an input object a pixel with a $\Delta C_t$ measurement that is greater than the group of $\Delta C_t$ measurements of the immediately surrounding pixels. The mutual capacitance sensing circuitry 515 may be configured to recognize as an input object any number and pattern of $\Delta C_t$ measurements corresponding to pixels.

Referring still to FIG. 7, input object 710 is placed on some portion of the sensor electrodes 520c, 520d and 520e as well as sensor electrodes 110f, 110g and 110h. The pixels corresponding to the crossing of the sensor electrode 520d and sensor electrode 110g show the largest $\Delta C_t$ since the entire pixel is covered by input object 710. However, the pixels corresponding to the crossings of the sensor electrode 520c and the sensor electrodes 110f, 110g and 110h show a much smaller $\Delta C_t$ since only a portion of the pixel are covered by the input object 710. Likewise, the pixels corresponding to the crossings of the sensor electrode 520e and the sensor electrodes 110f, 110g and 110h also show a much smaller $\Delta C_t$ since only a portion of the pixels are covered by the input object 710.

Additionally, FIG. 7 shows the input object 715 being placed on some portion of the sensor electrodes 520g, 520h and 520i as well as the sensor electrodes 110f, 110g and 110h. The pixels corresponding to the crossings of the sensor electrode 520h and the sensor electrode 110g show the largest $\Delta C_t$ since the entire pixel is covered by the input object 715. However, the pixels corresponding to the crossings of the sensor electrode 520g and the sensor electrodes 110g and 110h show a much smaller $\Delta C_t$ since only a portion of the pixels are covered by the input object 715. Likewise, the pixels corresponding to the crossings of the sensor electrode 520i and the sensor electrodes 110g and 110h also show a much smaller $\Delta C_t$ since only a portion of the pixels are covered by the input object 715. The location of the input object 715 can be determined to be relatively centered in the region surrounding the pixels with the largest $\Delta C_t$, and corresponding to the intersection of sensor electrode 520h and sensor electrode 110g.

Of note, the input objects 705 and 710 are placed on the same receiver sensor electrodes 520c, 520d and 520e, while also being placed on different transmitter sensor electrodes. At the same time, the input objects 710 and 715 are placed on the same transmitter electrodes 110f, 110g, and 110h, while being placed on different receiver electrodes. In order to determine the presence of multiple input objects 705, 710 and 715 on the same sensor electrodes, embodiments of the present technology scan the sensing region. Through scanning, the mutual capacitance sensing circuitry 515 is able to determine the placement of the input objects 705, 710 and 715 by the change in the mutual capacitance between a particular transmitter and receiver sensor electrode. More specifically, the mutual capacitance sensing circuitry 515 is able to determine that a $\Delta C_t$ occurs due to the placement of the input objects 705, 710, and 715 proximate to the sensing region. This information is gathered by the mutual capacitance sensing circuitry 515 during frequent scanning of the sensing region. Thus, coordinates for each of the input objects 705, 710 and 715 may be determined based upon the changes in mutual capacitance during the scanning of the sensing region.

The foregoing descriptions of specific embodiments have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the present technology be defined by the claims appended hereto and their equivalents.

What is claimed is:

1. A capacitive input device comprising:
   a plurality of receiver sensor electrodes oriented substantially parallel to a first axis proximate to a sensing region of said capacitive input device; and
   a plurality of transmitter sensor electrodes oriented substantially parallel to a second axis proximate to said sensing region and configured to be capacitively coupled with said plurality of receiver sensor electrodes;
   wherein at least one receiver sensor electrode of said plurality of receiver sensor electrodes is disposed in a configuration forming multiple crossings with a line that is parallel to said second axis, said multiple crossings occurring proximate to said sensing region.

2. The capacitive input device of claim 1, wherein the at least one receiver sensor electrode is u-shaped.

3. The capacitive input device of claim 1, wherein the at least one receiver sensor electrode is configured with a fillable two dimensional area.

4. The capacitive input device of claim 1, wherein the at least one receiver sensor electrode is configured with a bounded two dimensional area.

5. The capacitive input device of claim 4, wherein the bounded two dimensional area is formed by the receiver sensor electrode and an extension and an extension coupler.

6. The capacitive input device of claim 1, wherein the at least one receiver sensor electrode comprises portions of different widths.

7. The capacitive input device of claim 6, wherein the at least one receiver sensor electrode comprises substantially the same width at locations forming said multiple crossings with a line that is parallel to said second axis.

8. A capacitive input device configured to detect multiple input objects in a sensing region, said capacitive input device comprising:
   a plurality of first sensor electrodes oriented substantially parallel to a first axis;
   a plurality of second sensor electrodes oriented substantially parallel to a second axis; and
   mutual capacitance sensing circuitry communicatively coupled to said pluralities of first and second sensor electrodes and configured to transmit and receive sensing signals on said pluralities of first and second sensor electrodes;
   wherein at least one sensor electrode of said plurality of first sensor electrodes is disposed in a configuration forming multiple crossings with a line parallel to second axis, said multiple crossings occurring proximate to a sensing region of said capacitive input device.

9. The capacitive input device of claim 8, wherein said capacitive input device further comprises:
   a display.

10. The capacitive input device of claim 9, wherein at least one of said first and second axis is angled with respect to the display.

11. The capacitive input device of claim 8, wherein at least one said sensor electrode of said plurality of first sensor electrodes is configured with a fillable two dimensional area defined by said at least one sensor electrode.

12. The capacitive input device of claim 11, wherein said fillable two dimensional area is defined by said at least one sensor electrode and an extension.

13. The capacitive input device of claim 8, wherein said at least one sensor electrode of said plurality of first sensor electrodes comprises a bounded two dimensional area defined by said at least one sensor electrode.

14. The capacitive input device of claim 13, wherein said bounded two dimensional area is further defined by said at least one sensor electrode, an extension and an extension coupler.

15. The capacitive input device of claim 8, wherein one plurality of said pluralities of first and second sensor electrodes comprises transmitter sensor electrodes and the other plurality of said pluralities of first and second sensor electrodes comprises receiver sensor electrodes.

16. The capacitive input device of claim 15, wherein said mutual capacitance sensing circuitry is further configured to simultaneously transmit sensor signals on multiple transmitter sensor electrodes of said plurality of transmitter sensor electrodes.

17. The capacitive input device of claim 8, wherein at least one sensor electrode of said pluralities of first and second sensor electrode comprises portions of different widths.

18. The capacitive input device of claim 8, wherein said at least one sensor electrode comprises substantially the same width at locations forming said multiple crossings with a line that is parallel to said second axis.

* * * * *